US007793976B2

(12) United States Patent
Kuroe (10) Patent No.: US 7,793,976 B2
(45) Date of Patent: Sep. 14, 2010

(54) TETHER STRUCTURE FOR AIRBAG (75) Inventor: Takeshi Kuroe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 11/753,158

(22) Filed: May 24, 2007

(65) Prior Publication Data

US 2007/0273134 A1 Nov. 29, 2007

(30) Foreign Application Priority Data

May 29, 2006 (JP) ............... 2006-148141

(51) Int. Cl.
*B60R 21/16* (2006.01)
(52) U.S. Cl. .................. 280/743.2; 280/730.1
(58) Field of Classification Search ............. 280/743.2, 280/730.1
See application file for complete search history.

(56) References Cited

U.S. PATENT DOCUMENTS

| 5,452,915 | A | * | 9/1995 | Fredin ............. 280/743.2 |
| 5,887,894 | A | | 3/1999 | Castagner et al. |
| 6,932,385 | B2 | | 8/2005 | Hawthorn et al. |
| 7,021,657 | B2 | | 4/2006 | Kassman et al. |
| 2004/0051281 | A1 | * | 3/2004 | Miyata ............. 280/730.1 |
| 2004/0090055 | A1 | * | 5/2004 | Kassman et al. ....... 280/743.2 |
| 2004/0207189 | A1 | * | 10/2004 | Miyata ............. 280/743.2 |
| 2004/0256848 | A1 | * | 12/2004 | Miyata et al. ......... 280/743.2 |

FOREIGN PATENT DOCUMENTS

JP 2005-8055 A 1/2005

* cited by examiner

*Primary Examiner*—Paul N Dickson
*Assistant Examiner*—Keith Frisby
(74) *Attorney, Agent, or Firm*—Westerman, Hattori, Daniels & Adrian, LLP (57) ABSTRACT

An airbag is provided with first and second tethers and attached to the inner surface of the ceiling. The first tether extends towards the left side of the back face side from the center portion of the front face side facing a rider. The second tether extends towards the right side of the back face side from the center portion of the front face side. The first and second tethers are arranged into a substantially V-shape with the bottom on the rider's side. When the airbag is compressed in the back and forth direction by receiving a forward momentum of the rider, the expansion of the airbag is regulated by the first and second tethers on the front face side. The expansion in the right and left direction is not regulated by the first and second tethers on the back face side of the airbag. Accordingly, the airbag expands in the right and left direction on the back face side so as to have a wide width.

6 Claims, 7 Drawing Sheets

TETHER STRUCTURE FOR AIRBAG

FIELD OF THE INVENTION

The present invention relates to a tether structure for an airbag that is inflated with a high-pressure gas generated by an inflator so as to restrain a rider at the time of a crash of a vehicle, and particularly to a tether structure for airbag preferably used in a two-wheeled vehicle and a three-wheeled vehicle.

BACKGROUND OF THE INVENTION

An airbag system includes a gas generating source (an inflator) and an air bag. The gas generating source generates gas when a large acceleration is detected. The airbag is deployed and inflated by the gas generated by the gas generating source. The airbag is formed by stitching pieces of base fabric, each piece cut out into a predetermined shape.

In an airbag for vehicle, in order to effectively restrain a rider, it is preferable that the center of the ceiling wall of the airbag become planar when the airbag is deployed and inflated, and also that the amount of extension of the airbag towards the rider's side be limited to a predetermined amount. For this purpose, the cutting shape of each piece of base fabric forming an airbag is carefully designed so that the airbag can be deployed into a shape with which a rider is effectively restrained.

However, it is difficult to deploy an airbag into a desired shape only with the tension of base fabric. For this reason, in a conventional airbag system, as disclosed in Japanese Patent Application Laid-open Publication No. 2005-8055, a proximal end portion and a distal end portion in the inner surface of an airbag is connected to each other with a tether (straining fabric) made of a band-shaped piece of fabric. Accordingly, the shape of the airbag is stabilized with a tension caused by the straining tether when the airbag is deployed and inflated.

In a four-wheeled vehicle, an airbag on the driver's seat side is housed in the center portion of a circular steering wheel. When the airbag is deployed, the back side of the deployed airbag is uniformly supported by the entire surface of the circular steering wheel. Accordingly, it is easy to stabilize the position and shape of the airbag when the airbag is deployed and inflated. In addition, an airbag on the passenger's seat side is also housed in a planar instrument panel. For this reason, when the airbag is deployed and inflated, the back side of the airbag is uniformly retained by the instrument panel.

On the other hand, a two-wheeled vehicle and a three-wheeled vehicle often do not have a circular steering wheel. In addition, in the two-wheeled vehicle and the three-wheeled vehicle, a portion behind a space in which an airbag is deployed is not planar. For these reasons, while it has been possible to stabilize the shape of a deployed and inflated airbag, it has been difficult to stabilize the position.

Figure 5:
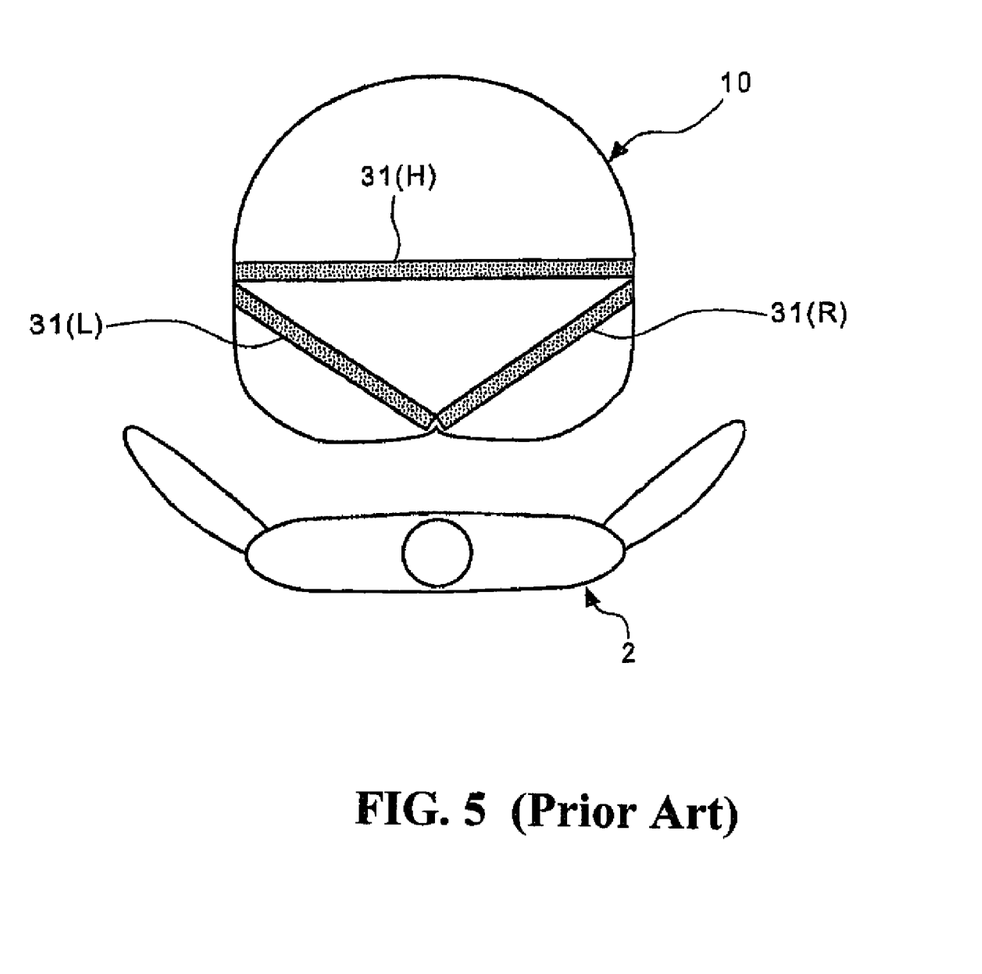
FIG. 5 is a top view of an airbag of a conventional technique in a state where the airbag is deployed and inflated.

FIG. 5 is a top view showing an example of a tether structure of a conventional airbag. In an airbag 10, three tethers 31L, 31R and 31H are positioned in a shape of isosceles triangle in the top view of the airbag at the time when the airbag is deployed and inflated. The three tethers 31L, 31R and 31H are then attached to the inner side of the airbag 10 so that a vertex of the isosceles triangle is positioned on the front face side which faces a rider 2.

Figure 6:
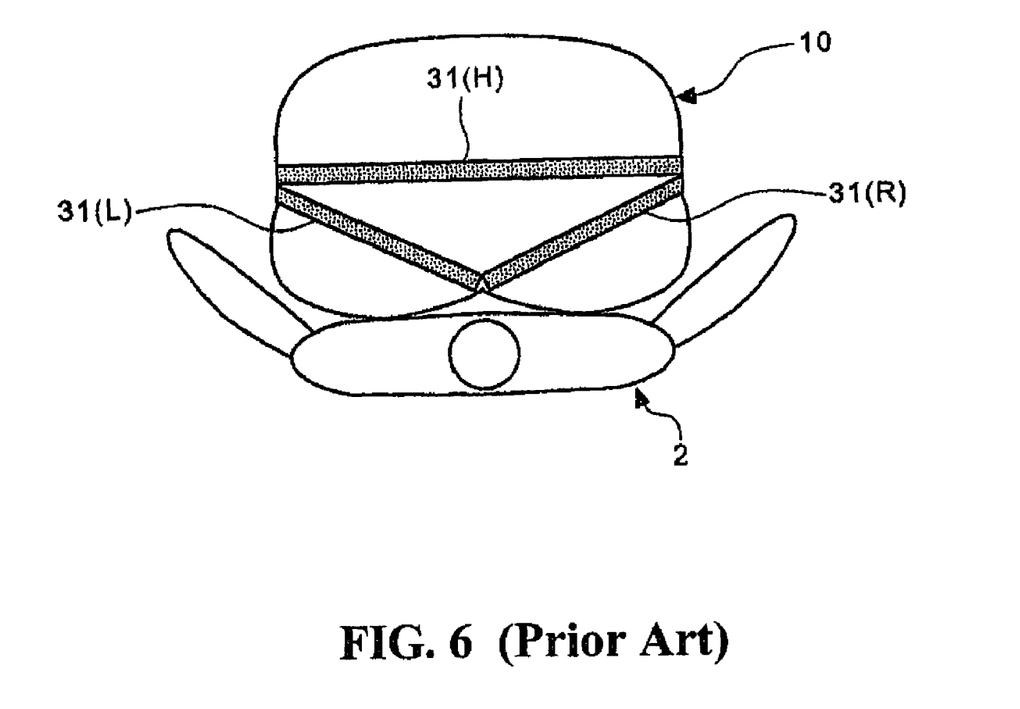
FIG. 6 is a top view of the airbag of the conventional technique at the time when the airbag restrains the rider.
Figure 7:
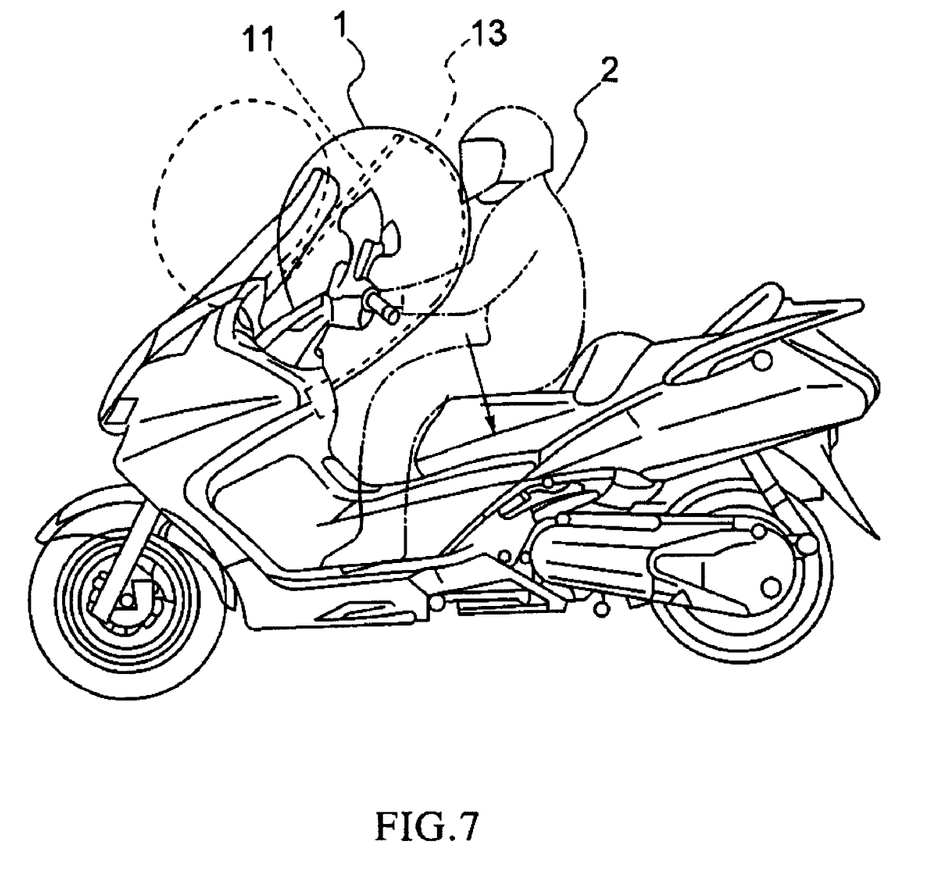
FIG. 7 is a side view of a motorcycle, with the airbag being deployed.

However, in the airbag 10 having such a tether structure, the following problem occurs. When the airbag 10 in the deployed and inflated state restrains the rider 2, the airbag 10 is compressed in the back and forth direction by receiving a forward momentum of the rider 2. At this time, however, the expansion of the airbag 10 in the right and left direction is limited especially by the lateral tether 31(H), as shown in FIG. 6. As a result, the expansion of the airbag 10 in the right and left direction is limited also on the back face side. Accordingly, since an area where the airbag 10 is brought into contact with the vehicle is not extended, it is difficult to stabilize the position of the airbag 10.

Incidentally, in a case where the shape and position of a deployed airbag is unstable, a countermeasure has been sometimes taken, in which the volume of an airbag is increased. However, it is difficult to increase the volume of an airbag in the case of a two-wheeled vehicle and a three-wheeled vehicle each having severe constraints with respect to a space in which an airbag is installed, and also with respect to increase in weight.

An object of the present invention is to solve the above described problem in the conventional technique. Specifically, an object of the present invention is to provide an airbag, whose position and shape can be properly maintained without increase in the volume when the airbag is deployed and inflated, to a two-wheeled vehicle and a three-wheeled vehicle in which it is often difficult to house an airbag in the center portion of a circular steering wheel.

SUMMARY OF THE INVENTION

In order to achieve the above described object, the present invention has the following characteristic. In an airbag which is deployed and inflated with gas generated by a gas generating source, a tether structure for airbag includes a first tether and a second tether. The first tether is attached to the inner surface of the ceiling of the airbag in the deployed and inflated state, and also extends towards the left side of the back face side of the airbag from the center portion of the front face side facing a rider. The second tether is attached to the inner surface of the ceiling of the airbag in the deployed and inflated state, and also extends towards the right side of the back face side of the airbag from the front face side facing the rider.

According to the present invention, the first and second tethers extend from the front face side facing the rider towards the left and right sides of the back face side, respectively. When the airbag that is deployed and inflated restrains a rider, the airbag is compressed in the back and forth direction. At this time, with the above structure, the expansion of the airbag in the right and left direction is regulated by the first and second tether on the front face side, while a region sandwiched by the first and second tethers is depressed more than a region on the outer side of the first and second tethers is. As a result, it is possible to restrain a rider in the right and left direction with the depressed portion.

In addition, the expansion of the airbag in the right and left direction is not regulated by the first and second tether on the back face side. Accordingly, a part of the airbag on the back face side expands in the right and left direction so as to have a wide width. As a result, the back face of the airbag can be supported by a wide area of the vehicle body, so that the position of the airbag in the deployed and inflated state is stabilized.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
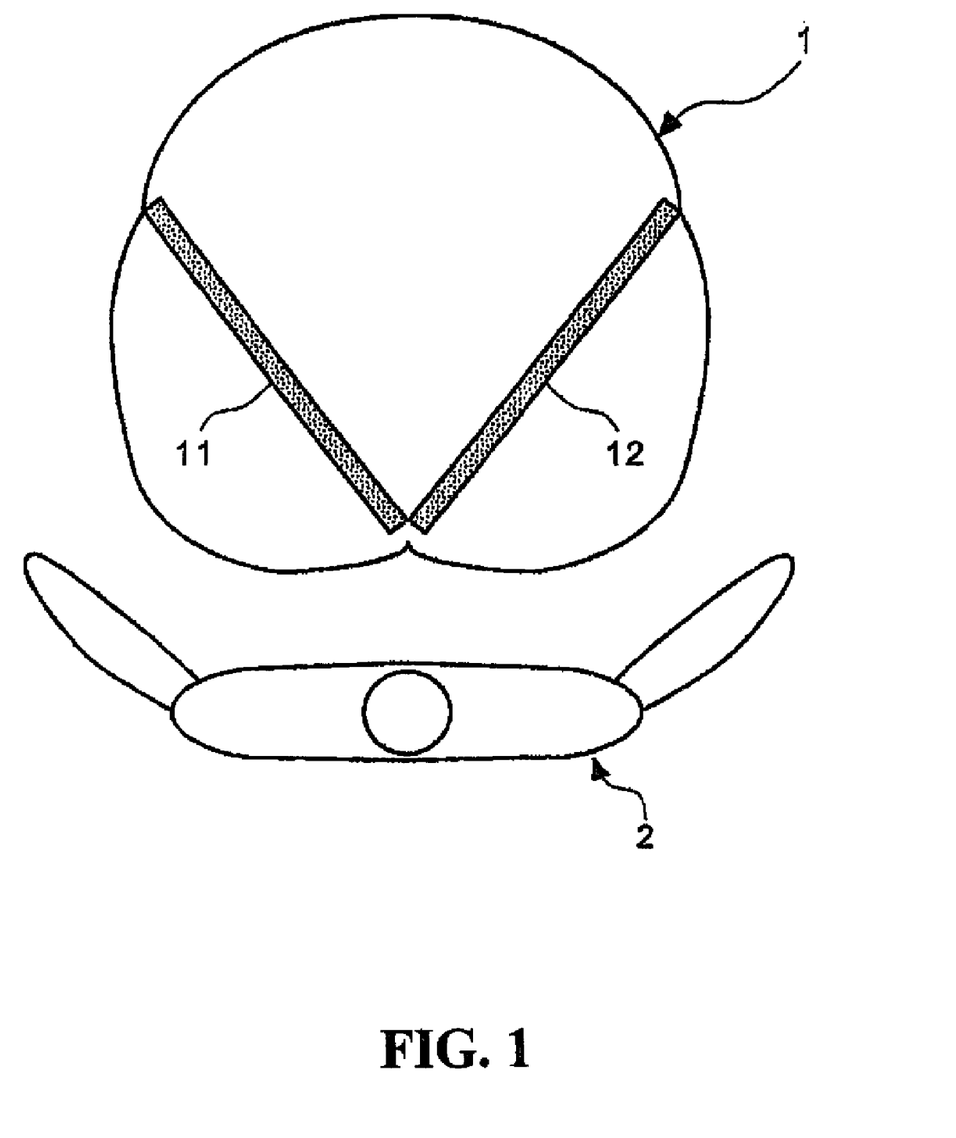
FIG. 1 is a top view of an airbag for two-wheeled vehicle according to the first embodiment of the present invention in a state where the airbag is deployed and inflated.

Hereinafter, descriptions will be given in detail of embodiments of the present invention with reference to the drawings. FIG. 1 is a top view of an airbag for two-wheeled vehicle according to a first embodiment of the present invention, and shows the airbag in a state where the airbag is deployed and inflated with gas generated by gas generating source (not shown).

An airbag 1 includes first and second tethers 11 and 12, both of which are attached to the inner surface of the ceiling of the airbag 1 in the deployed and inflated state. The first tether 11 extends towards the left side of the back face side of the airbag 1 from the center portion of the front face side, which faces a rider 2. On the other hand, the second tether 12 extends towards the right side of the back face side from the same center portion. The first and second tethers 11 and 12 are arranged in a substantially "V" shape with the bottom on the rider's side.

Figure 2:
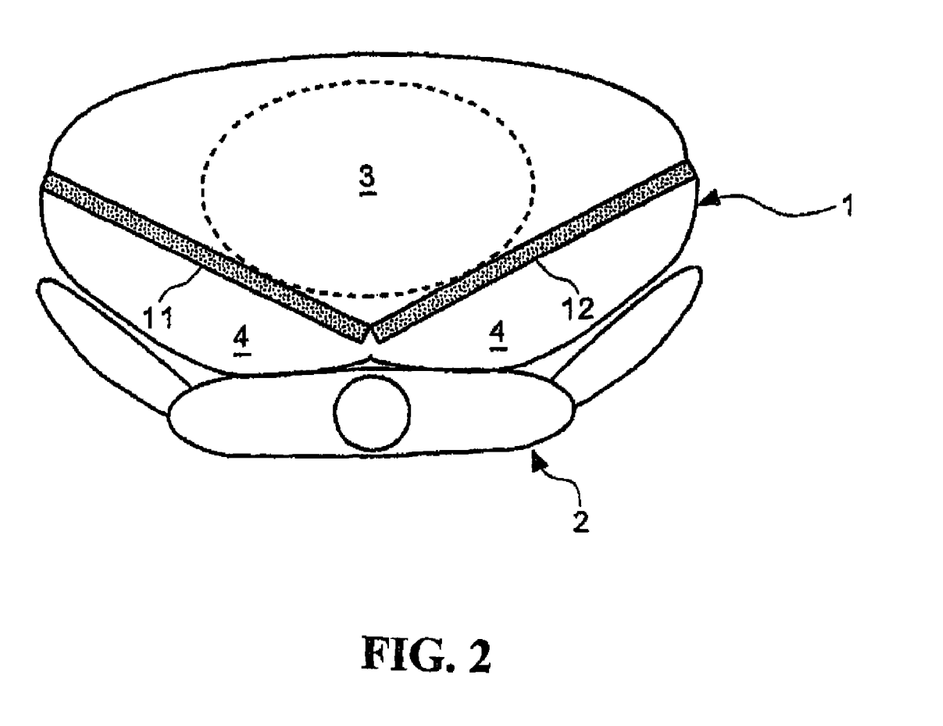
FIG. 2 is a top view of the airbag for two-wheeled vehicle according to the first embodiment of the present invention at the time when the airbag restrains the rider.

FIG. 2 is a top view of the airbag 1 in the following state. Specifically, when the airbag 1 restrains the rider 2, the airbag 1 receives a forward momentum of the rider 2. Accordingly, the airbag 1 is compressed in the back and forth direction, and is then deformed with an increased internal pressure.

In this embodiment, when the airbag 1 is compressed in the back and forth direction by receiving the forward momentum of the rider 2, the expansion of the airbag 1 in the right and left direction is regulated by the first and second tethers 11 and 12 on the front face side. As a result, a region 3 sandwiched by the first and second tethers 11 and 12 becomes more planar than a region 4 on the outer side of the first and second tethers 11 and 12. Accordingly, it is possible to securely restrain the rider with the substantially planar region 3.

Moreover, in this embodiment, even when the airbag 1 is compressed in the back and forth direction, the expansion of the airbag 1 in the right and left direction is not regulated by the first and second tethers 11 and 12 on the back face side. For this reason, a part of the airbag 1 on the back face side expands in the right and left direction so as to have a wider width than other parts. As a result, the back face side of the airbag 1 abuts on the side of the vehicle body in a wide area. Accordingly, it is possible to securely retain the airbag 1 even without a planar portion that supports the airbag 1 on the side of the vehicle body, the side facing the back face side of the airbag 1.

Figure 3:
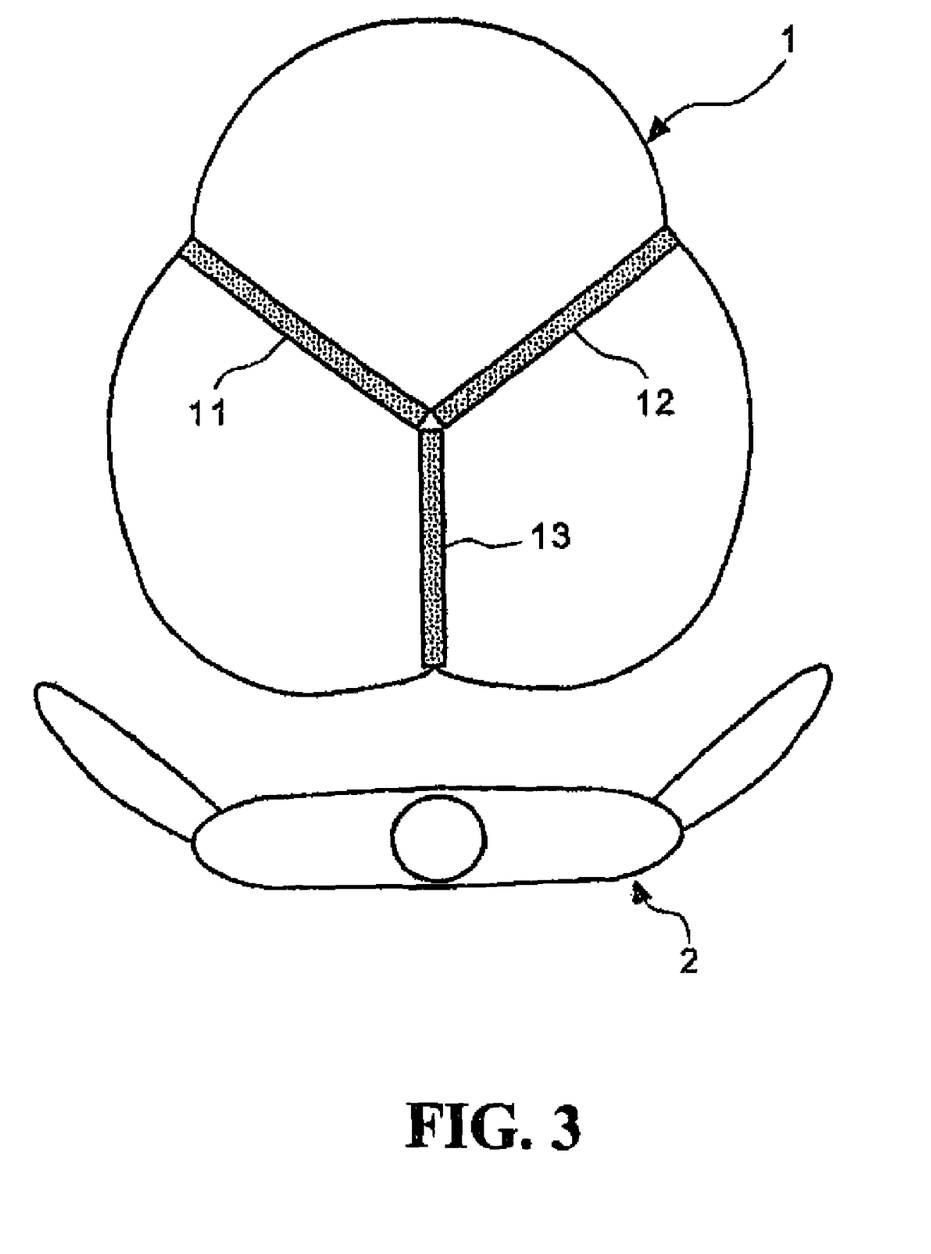
FIG. 3 is a top view of an airbag for two-wheeled vehicle according to a second embodiment of the present invention in a state where the airbag is deployed and inflated.

FIG. 3 is a top view of an airbag for two-wheeled vehicle according to a second embodiment of the present invention in a state where the airbag is deployed and inflated.

An airbag 1 includes first, second and third tethers 11, 12 and 13, all of which are attached to the inner surface of a ceiling of the airbag 1 in a state where the airbag is deployed and inflated. The first tether 11 extends from the center portion of the front face side, which faces a rider 2, of the airbag 1 towards the left side of the back face side of the airbag 1. The second tether 12 extends from the same center portion towards the right side of the back face side. The third tether 13 extends from the ends, on the rider's side, of the first and second tethers 11 and 12 to the rider's side. The first, second and third tethers 11, 12 and 13 are arranged so as to form a general Y shape with the bottom on the rider's side.

Figure 4:
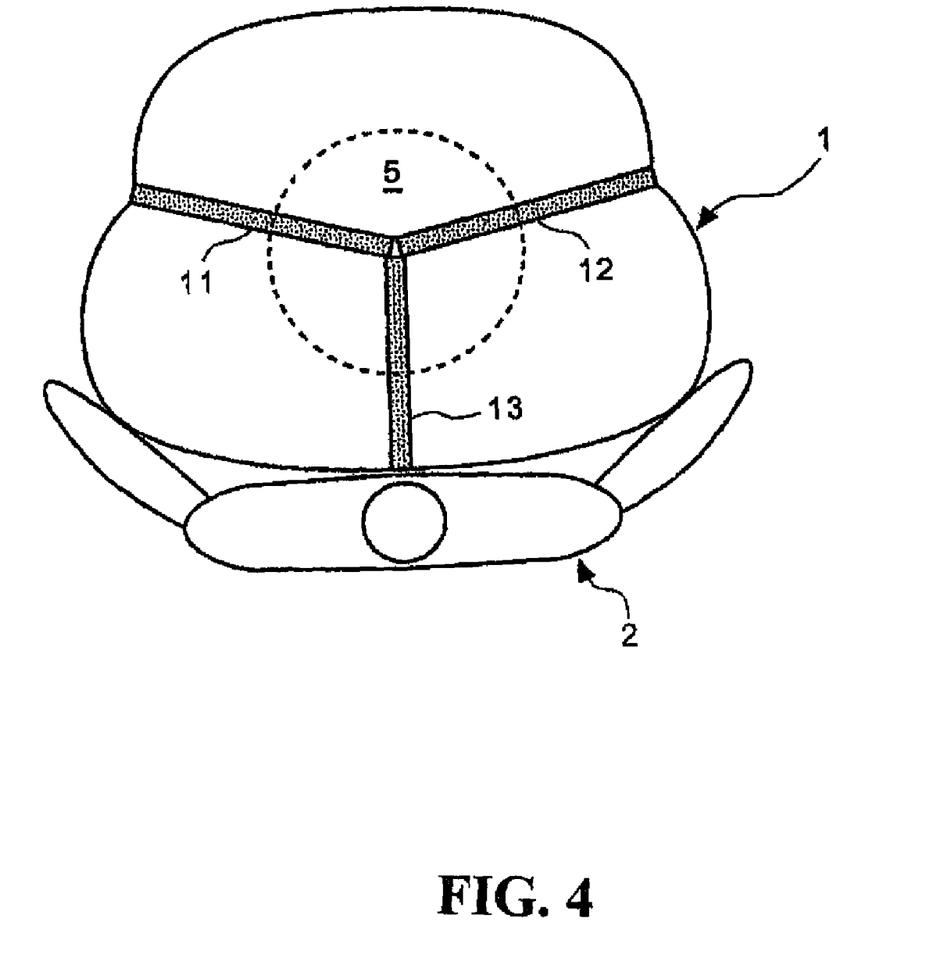
FIG. 4 is a top view of the airbag for two-wheeled vehicle according to the second embodiment of the present invention at the time when the airbag restrains the rider.

FIG. 4 is a top view of the airbag in the following state. Specifically, when the airbag restrains the rider 2, the airbag 1 receives a forward momentum of the rider 2. Thereby, the airbag 1 is compressed in the back and forth direction, and is deformed with an increased internal pressure.

In this embodiment, when the airbag 1 is compressed in the back and forth direction by receiving the forward momentum of the rider 2, the expansion of the airbag 1 in the right and left direction is regulated by the first, second and third tethers 11, 12 and 13 on the front face side. In addition, since a region 5 which includes the first, second and third tethers 11, 12 and 13 becomes substantially planar, it is possible to securely restrain the rider with the planar region 5.

Moreover, in this embodiment, even when the airbag 1 is compressed in the back and forth direction, the expansion of the airbag 1 in the right and left direction is not regulated by the first and second tethers 11 and 12 on the back face side. For this reason, a part of the airbag 1 on the back face side expands in the right and left direction so as to have a wide width. As a result, the back face side of the airbag 1 abuts on the side of the vehicle body in a wide area. Accordingly, it is possible to securely retain the airbag 1 even without a planar portion that supports the airbag 1 on the side of the vehicle body, the side facing the back face side of the airbag 1.

In this detailed description of the invention, reference is made to the accompanying drawings, which form a part hereof, and within which are shown by way of illustration specific embodiments by which the invention may be practiced. It is understood that other embodiments may be utilized and structural changes may be made without departing from the scope of the invention.

I claim:

1. A two-wheeled or three-wheeled vehicle having a tether structure for an airbag that is deployed and inflated with gas generated by a gas generating source, the tether structure comprising:

a first tether, which is attached to an inner surface of a ceiling of the airbag in a deployed and inflated state, and which extends towards a left side of a back face side of the airbag from a center portion of a front face side facing a rider of the vehicle;

a second tether, which is attached to said inner surface of said ceiling of the airbag in said deployed and inflated state, and which extends towards a right side of said back face side of the airbag from said center portion of said front face side facing the rider of the vehicle; and a third tether, which is attached to said inner surface of said ceiling of the airbag in said deployed and inflated state, wherein said first and second tethers are disposed so as to form a substantial V-shape with a bottom thereof facing said rider in a top view of the airbag in said deployed and inflated state, and said third tether extends to said front face side from an end portion nearest the rider of said first and second tethers arranged into said substantial V-shape, and when the airbag is compressed in the back and forth direction by receiving a forward momentum from the rider of the vehicle, an expansion of the front face side of the airbag in the right and left direction is regulated by the first and second tethers, and an expansion of the back face side of the airbag in the right and left direction is not regulated by the first and second tethers.

2. The tether structure for the airbag according to claim 1, wherein said first, second and third tethers are disposed so as to form a substantial Y-shape with a bottom thereof facing said rider in a top view of the airbag in said deployed and inflated state.

3. The tether structure for the airbag according to claim 2, wherein said first, second, and third tethers form an opened substantial Y-shape.

4. The tether structure for the airbag according to claim 1, wherein said first and second tether structure forms an opened substantial V-shape.

5. A two-wheeled or three-wheeled vehicle having a tether structure for an airbag that is deployed and inflated with gas generated by a gas generating source, the tether structure comprising:
- a first tether, which is attached to an inner surface of a ceiling of the airbag in a deployed and inflated state, and which extends towards a left side of a back face side of the airbag from a center portion of a front face side facing a rider of the vehicle; and
- a second tether, which is attached to said inner surface of said ceiling of the airbag in said deployed and inflated state, and which extends towards a right side of said back face side of the airbag from said center portion of said front face side facing the rider of the vehicle; and
- said first and second tethers are disposed so as to form an opened substantial V-shape with a bottom thereof facing said rider in a top view of the airbag in said deployed and inflated state, wherein
- when the airbag is compressed in the back and forth direction by receiving a forward momentum from the rider of the vehicle,
- on the front face side an expansion of the airbag in the right and left direction is regulated by the first and second tethers, and
- on the back face side the expansion of the airbag in the right and left direction is not regulated by the first and second tethers.

6. A two-wheeled or three-wheeled vehicle having a tether structure for an airbag that is deployed and inflated with gas generated by a gas generating source, the tether structure comprising:
- a first tether attached to an inner surface of a ceiling of the airbag in a deployed and inflated state, and which extends towards a left side of a back face side of the airbag from a center portion of a front face side facing a rider of the vehicle; and
- a second tether attached to said inner surface of said ceiling of the airbag in said deployed and inflated state, and which extends towards a right side of said back face side of the airbag from said center portion of said front face side facing the rider of the vehicle; and
- a third tether attached to said inner surface of said ceiling of the airbag in said deployed and inflated state, and which extends to said front face side from an end portion nearest the rider of said first and second tethers,
- said first, second, and third tethers are disposed so as to form an opened substantial Y-shape with a bottom thereof facing said rider in a top view of the airbag in said deployed and inflated state, wherein
- when the airbag is compressed in the back and forth direction by receiving a forward momentum from the rider of the vehicle,
- on the front face side an expansion of the airbag in the right and left direction is regulated by the first and second tethers, and
- on the back face side the expansion of the airbag in the right and left direction is not regulated by the first and second tethers.

* * * * *